United States Patent Office 2,803,619
Patented Aug. 20, 1957

2,803,619

LOW COMPRESSION SET SILOXANE ELASTOMERS CONTAINING A VINYL ORGANOSILOXANE

Norbert G. Dickmann, Midland, Mich., assignor to Dow Corning Corporation, Midland, Mich., a corporation of Michigan No Drawing. Application December 23, 1954, Serial No. 477,407

6 Claims. (Cl. 260—42)

This invention relates to novel organopolysiloxane elastomers.

One of the problems which has long existed in the silicone rubber art has been the production of low compression set silicone rubbers, that is, rubbers having compression sets below 40%. Solutions to this problem have been found by adding certain metallic compounds such as mercuric oxide, cadmium oxide, and the like. However, these additives are toxic and thus cannot be employed in connection with siloxane rubbers which are to be used in the food or pharmaceutical industries. As a result there is a need for a way of reducing the compression set of siloxane elastomers with a non-toxic material.

It is taught in U. S. Patent 2,445,794 that the compression set of methylsiloxane elastomers can be lowered by copolymerizing therewith vinylsiloxanes. It has been stressed throughout the art that it was necessary to copolymerize the vinyl with the methylsiloxane. Applicant has found most unexpectedly that a low compression set may be obtained by merely mixing the hereinafter defined vinyl-containing siloxane with a non-alkenyl-containing siloxane. This is advantageous since any fabricator can merely mill in some vinyl siloxane with a master batch and thereby reduce the compression set of the siloxane rubber.

It is the primary object of this invention to produce low compression set siloxane rubbers which are free of toxic additives and which can be obtained without the necessity of copolymerizing a vinylsiloxane with the elastomer base polymer. Other objects and advantages will be apparent from the following description.

This invention relates to a composition of matter comprising a mixture of (1) a non-alkenyl containing diorganopolysiloxane gum, (2) a vinyl-containing polysiloxane having at least 12 silicon atoms per molecule, siloxane (2) being present in amount such that in the mixture of siloxanes there is from 1 vinyl radical per 5,000 silicon atoms to 1 vinyl radical per 20 silicon atoms, and (3) an organo peroxide vulcanizing agent.

The critical ingredient of the compositions of this invention is the vinylpolysiloxane. These materials may range from thin fluids having 12 silicon atoms per molecule up to non-flowing insoluble gums. The vinylsiloxane must be employed in amount so that the total vinyl content of the mixture will be within the specified ranges. If the vinyl content of the mixture is below 1 vinyl radical per 5,000 silicon atoms, no appreciable reduction in the compression set is obtained. If the amount of vinylsiloxane is such that there is more than 1 vinyl radical per 20 silicon atoms the resulting vulcanized material is no longer elastomeric.

The vinyl siloxane (2) may be either a homopolymer in which all of the organic radicals are vinyl radicals or it may be a homopolymer containing vinyl radicals plus other hydrocarbon radicals such as for example, vinylmethylsiloxane, vinylphenylsiloxane, vinylethylsiloxane, vinyltolylsiloxane, or vinyloctadecylsiloxane. In addition the vinyl containing siloxane may be a copolymer of a vinylsiloxane with other hydrocarbon substituted siloxanes. For example, the vinylsiloxane may be a copolymer of dimethylsiloxane, vinylmethylsiloxane, and trimethylsiloxane; a copolymer of vinylmethylsiloxane, and dimethylsiloxane; a copolymer of vinylphenylsiloxane, phenylmethylsiloxane, and trimethylsiloxane; a copolymer of octadecylmethylsiloxane, vinyltolylsiloxane, and monophenylsiloxane; a copolymer of divinylsiloxane and dimethylsiloxane; and a copolymer of xenylmethylsiloxane, vinylmethylsiloxane, and trimethylsiloxane. Preferably the siloxane (2) should have an average of from 1.9 to 2.17 total organic groups per silicon atom.

The siloxane gum (1) which is employed as the base polymer in the elastomers of this invention may be any diorganosiloxane. For example, the organic radicals attached to the silicon may be any non-alkenyl monovalent hydrocarbon radical such as methyl, ethyl, octadecyl, cyclohexyl, phenyl, tolyl, xenyl, or chlorinated non-alkenyl monovalent hydrocarbon radicals such as chlorophenyl, chloroxenyl, $\alpha,\alpha,\alpha$-trifluorotolyl or tetrafluoroethyl. The preferred radicals from the standpoint of thermal stability are methyl, phenyl, and fluorinated hydrocarbon radicals. The polymer gums can be either benzene souble non-flowing materials or insoluble gels.

The peroxides employed in the compositions of this invention can be any organic peroxide. The preferred peroxides are the aromatic acyl peroxides such as benzoyl peroxide, tertiary butylperbenzoate, dichloro benzoyl-peroxide and monochlorobenzoyl peroxide.

If desired the compositions of this invention may include fillers in order to improve the physical properties thereof. Suitable fillers include metal oxides such as titania, ferric oxide, zinc oxide, magnesium oxide and the like and silicas such as diatomaceous earth, crushed quartz and silica aerogels. The preferred fillers are finely divided fillers such as fume silicas and silica aerogels. If desired, the fillers may be treated with chlorosilanes or other hydrolyzable silanes.

The compositions of this invention are produced by merely mixing the above ingredients until a uniform mix is obtained. It is often desirable to mix siloxanes (1) and (2) together with the filler and then heat for a few hours at 250° C. The vulcanizing agent is then incorporated and the mixture may be vulcanized as desired. The vulcanization of the compositions of this invention may be accomplished in any of the well known ways for vulcanizing siloxane elastomers.

The elastomers of this invention may contain other specific additives such as for example, zirconates, to improve thermal stability of the rubber, pigments, electrically conductive fillers, or other additives which are normally employed in conjunction with siloxane elastomers.

The following examples are illustrative only and should not be construed as limiting the invention which is properly delineated in the appended claims. All of the compression set values given in the following examples were determined in accordance with ASTM Test No. D-395–49–T Method B except that the samples were compressed for 22 hours at 150° C. or 70 hours at 150° C. as indicated.

*Example 1*

In each of the compositions shown below the siloxane fluids were milled with 100 parts by weight of a dimethylpolysiloxane gum, 35 parts by weight of a fume silica, 15 parts by weight diatomaceous earth, and 1.4 parts by weight dichlorobenzoyl peroxide. The fluids employed were as follows:

(A) a copolymer of 89 mol percent dimethylsiloxane, 10 mol percent phenylvinylsiloxane and 1 mol percent trimethylsiloxane having a viscosity of 3,240 cs., (B) a copolymer of 97 mol percent dimethylsiloxane, 2 mol percent methylvinylsiloxane and 1 mol percent trimethylsiloxane having a viscosity of 599 cs. and (C) a copolymer of 49 mol percent dimethylsiloxane, 50 mol percent methylvinylsiloxane and 1 mol percent trimethylsiloxane having a viscosity of 7,940 cs. The various samples were vulcanized by heating 5 minutes at 150° C. and thereafter curing 24 hours at 250° C. The resulting elastomers had properties shown below:

| Fluid | Amount in parts by weight | Tensile in p. s. i. | Percent Elongation at break | Percent Compression set | |
|---|---|---|---|---|---|
| | | | | 22 hrs. at 150° C. | 70 hrs. at 150° C. |
| None | | 832 | 310 | 50 | 72 |
| A | 5 | 770 | 230 | 26 | 53 |
| A | 10 | 723 | 227 | 26 | 42 |
| B | 10 | 920 | 260 | 30 | 49 |
| C | ½ | 828 | 197 | 31 | 62 |
| C | 1 | 805 | 180 | 37 | 51 |

*Example 2*

92.9 parts by weight of a dimethylpolysiloxane gum, 7.1 parts by weight of a copolymer gum comprising 4 mol percent methylvinylsiloxane and 96 mol percent dimethylsiloxane, 35 parts by weight of a fume silica, 1.5 parts by weight diatomaceous earth, 3 parts by weight ferric oxide, and .8 part by weight dichlorobenzoyl peroxide were milled together until a uniform mix was obtained. The mix was heated 5 minutes at 126° C. and then 24 hours at 250° C. The resulting elastomer had the following properties: tensile strength 637 p. s. i.; elongation at break 354%; and compression set after 22 hours at 150° C. 36%. An identical formulation containing no vinylsiloxane had a compression set of 90% after 22 hours at 150° C.

*Example 3*

71.6 parts by weight of a dimethylpolysiloxane gum, 28.4 parts by weight of a polysiloxane gum composed of 1% vinylmethylsiloxane and 99% dimethylsiloxane, 35 parts by weight of a fume silica, 1.5 parts by weight diatomaceous earth, 3 parts by weight ferric oxide and .8 part by weight dichlorobenzoyl peroxide were milled until a uniform mix was obtained and the resulting product thereafter vulcanized and cured as in Example 1. The resulting elastomer had the following properties: tensile strength 717 p. s. i.; elongation at break 214%; compression set after 22 hours at 150° C. 23%.

*Example 4*

Equivalent results are obtained when copolymers of 95 mol percent dimethylsiloxane and 5 mol percent phenylmethylsiloxane or 5 mol percent diphenylsiloxane are employed as the siloxane gum in the procedure of Example 1.

That which is claimed is:

1. A heat hardenable composition of matter comprising a mixture of (1) a diorganopolysiloxane gum in which the organic radicals are all attached to the silicon through silicon-carbon linkages, all of said organic radicals being free of aliphatic unsaturation, (2) a vinyl containing organosiloxane in which all of the vinyl radicals and any other organic radicals present in said siloxane (2) are attached to the silicon through silicon-carbon linkages, the proportions of (1) and (2) being such that in the siloxane mixture there is from 1 vinyl radical per 5,000 silicon atoms to 1 vinyl radical per 20,000 silicon atoms and (3) an organic peroxide vulcanizing agent.

2. A composition in accordance with claim 1 in which siloxane (1) is a dimethylpolysiloxane gum.

3. A composition in accordance with claim 1 in which siloxane (1) is a methylphenylpolysiloxane gum.

4. A heat hardenable composition of matter comprising a mixture of (1) a diorganopolysiloxane gum in which the organic radicals are all attached to the silicon through silicon-carbon linkages, all of said organic radicals being free of aliphatic unsaturation, (2) a vinyl containing organosiloxane in which all of the vinyl radicals and any other organic radicals present in said siloxane (2) are attached to the silicon through silicon-carbon linkages, the proportions of (1) and (2) being such that in the siloxane mixture there is from 1 vinyl radical per 5,000 silicon atoms to 1 vinyl radical per 20,000 silicon atoms, (3) an organic peroxide vulcanizing agent and (4) a filler.

5. A composition in accordance with claim 4 in which siloxane (1) is a dimethylpolysiloxane gum.

6. A composition in accordance with claim 4 in which siloxane (1) is a phenylmethylpolysiloxane gum.

References Cited in the file of this patent
UNITED STATES PATENTS

| 2,442,196 | Coggeshall | May 25, 1948 |
| 2,445,794 | Marsden | July 27, 1948 |

UNITED STATES PATENT OFFICE

CERTIFICATE OF CORRECTION

Patent No. 2,803,619　　　　　　　　　　　　　　　　　　　August 20, 1957

Norbert G. Dickmann

It is hereby certified that error appears in the above numbered patent requiring correction and that the said Letters Patent should read as corrected below.

In the grant, line 1, name of inventor, for "Norberg G. Dickmann" read -- Norbert G. Dickmann --; in the printed specification, column 1, lines 48 and 49, for "siloxance" read -- siloxane --; column 2, line 23, for "souble" read -- soluble --; line 34, for "aerogels" read -- xerogels --.

Signed and sealed this 14th day of January 1958.

(SEAL)
Attest:

KARL H. AXLINE　　　　　　　　　　　　　　　　　　　　　ROBERT C. WATSON
Attesting Officer　　　　　　　　　　　　　　　　　　　Commissioner of Patents